Feb. 6, 1968     A. K. NEWMAN     3,367,465
CENTRIFUGAL CLUTCH
Filed Jan. 10, 1966
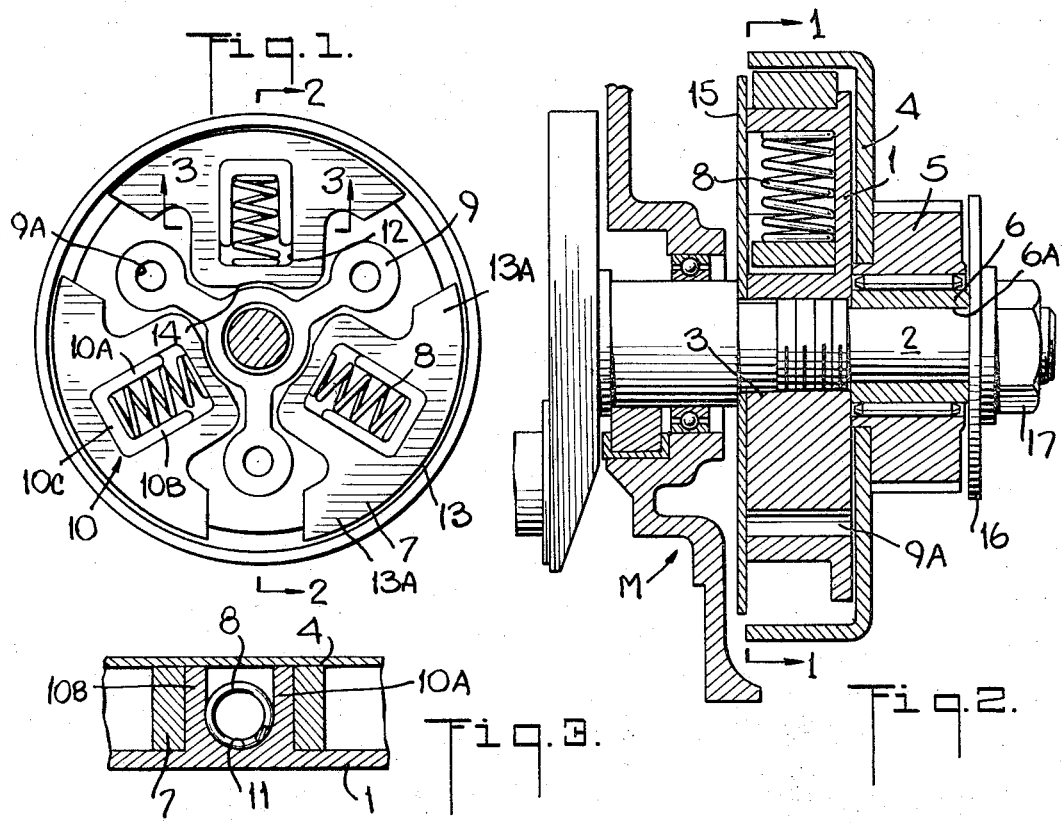
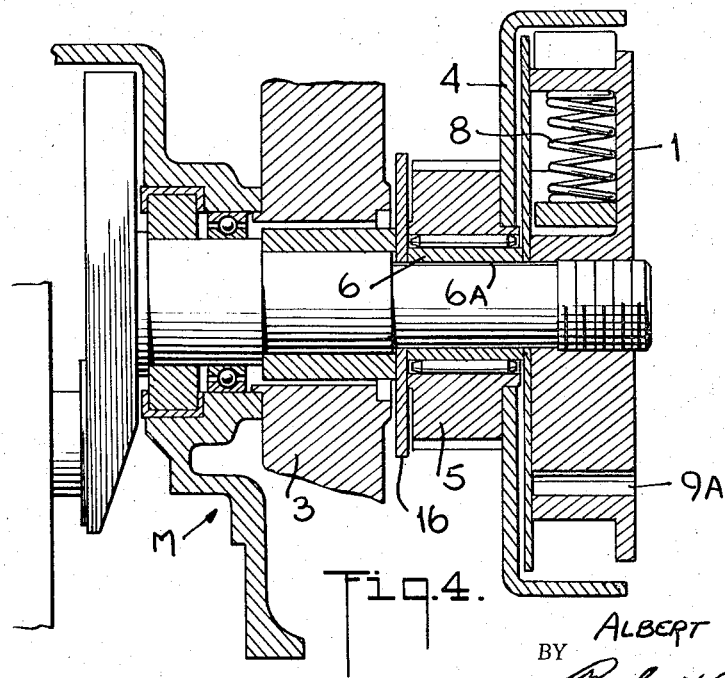
INVENTOR.
ALBERT K. NEWMAN
BY *Robert E Burns*
ATTORNEY ns patent office 3,367,465
Patented Feb. 6, 1968

3,367,465
CENTRIFUGAL CLUTCH
Albert K. Newman, Noroton, Conn., assignor to Textron, Inc., Providence, R.I., a corporation of Rhode Island
Filed Jan. 10, 1966, Ser. No. 519,661
2 Claims. (Cl. 192—105)

ABSTRACT OF THE DISCLOSURE

A centrifugal clutch comprises a rotatable hollow drum and a rotatable clutch plate disposed in the drum and having a central driving hub. The clutch plate is provided with a plurality of U-shaped projections which extend axially from the clutch plate and are arranged symmetrically about the driving hub. Each of the projections comprises spaced parallel side walls which are approximately parallel to a radius of the clutch plate between the side walls and an end wall joining the radially outer ends of the side walls to form a spring-receiving stall having an open end which faces the hub of the clutch plate. A portion of the clutch plate between the two side walls of each projection forms a bottom of the stall. A clutch shoe associated with each of the U-shaped projections has a rectangular opening of such size as to permit the shoe to fit over the projection but with additional length to permit limited radial movement of the shoe. A helical compression spring is disposed in each of the stalls and has one end bearing against the end wall of the U-shaped projection and its opposite end bearing against the shoe so as to bias the shoe radially inwardly away from the rotating drum. Each of the shoes is individually responsive to centrifugal force upon rotation of the clutch at a selected speed so as to overcome the biasing force of the respective helical spring and move radially outwardly into engagement with the drum so as to induce rotary movement of the drum. The clutch shoes have an axial thickness approximately equal to the axial dimension of the U-shaped projections and the springs are disposed substantially radial of the clutch plate and in line with the center of mass of the associated clutch shoe so that the line of action of the centrifugal force of each clutch shoe is substantially coincident with the axis of the respective spring.

---

This invention relates in general to power transmission devices and in particular to a centrifugal clutch.

An object of this invention is to provide a centrifugal clutch having a clutch plate incorporating novel retaining, biasing and guiding means for the clutch shoes.

Another object of this invention is to provide a centrifugal clutch free from objectionable tilting and binding of the clutch shoes.

A further object of the invention is to provide a centrifugal clutch of improved design which is economical to manufacture and highly satisfactory in service.

Other objects and a fuller understanding of the invention may be had by referring to the following description and claims, taken in conjunction with the accompanying drawing in which:

FIG. 1 is a cross section of a centrifugal clutch in accordance with the invention taken on the line 1—1 in FIG. 2.

FIG. 2 is an axial sectional view of the centrifugal clutch taken on the line 2—2 in FIG. 1.

FIG. 3 is a fragmentary cross sectional view taken on the line 3—3 of FIG. 1.

FIG. 4 is an axial section similar to FIG. 2 but showing a different arrangement of the components.

With reference to FIGS. 1 and 2, the centrifugal clutch in accordance with this invention comprises a clutch plate 1 mounted on a drive shaft 2 for rotation therewith by means of an internally threaded driving hub 3. The clutch plate is mounted within and concentric with a hollow rotatable drum 4 having power take-off means such as the sprocket wheel 5 shown fitting onto a central hub portion 6 as in FIG. 2. Alternatively, the power take-off means may comprise means other than the sprocket wheel such as a belt pulley, or a spur gear. The hub position 6 comprises a bearing 6A which receives and is rotatable on the shaft 2. This bearing may be a roller, needle or ball bearing but is shown by way of example as a sleeve bearing.

Mounted on the clutch plate 1, FIG. 1, are a plurality of clutch shoes 7 which are responsive to centrifugal force and are adapted to move radially outward, in the direction away from the driving hub, under the influence of centrifugal force developed by rotation of the driving hub. The outward movement of the clutch shoes 7 is opposed by helical spring elements 8 mounted within each of the clutch shoes which bias the clutch shoes radially inward, in the direction toward the driving hub. Rotation of the driving hub at a predetermined speed results in a centrifugal force urging the clutch shoes 7 radially outward, overcoming the inward biasing force of the helical springs 8 and engaging the hollow rotatable drum 4 causing the drum to rotate in unison with the driving hub.

The clutch plate 1 is provided with three symmetrically disposed radial wing-like structures 9 each having a through hole 9A at its outer end for the purpose of allowing the engagement of a wrench to unscrew the clutch plate from the driving shaft in the event it is desired to remove the clutch plate from shaft. Between the radial wing-like structures 9 are three U-shaped projections 10 on the clutch plate, each projection comprising three walls substantially perpendicular to the plane of the clutch plate. Two of the walls 10A and 10B are substantially parallel to one another and are disposed on either side of and at equal distances from a radial line passing through the driving hub. The third wall 10C is substantially perpendicular to the two parallel walls and is joined to the two parallel walls at the end of the parallel walls farthest from the driving hub. The side walls 10A, 10B and end wall 10C define a spring-receiving stall having an open end facing the hub 3. A portion of the clutch plate between the side walls 10A, 10B provides a bottom surface 11 of the spring-receiving stall which as shown in FIG. 3 is concavely arcuate, having a radius of curvature substantially equal to the outer radius of the helical spring 8 disposed within the U-shaped projection. The U-shaped projection by virtue of its walls and arcuate bottom portion 11 serves to position the helical spring and to transmit the spring force to the clutch plate.

Three clutch shoes 7 each having a rectangular opening 12 extending through the shoes are disposed on the clutch plate with a U-shaped projection 10 extending through the rectangular opening of each shoe. Each of the rectangular openings has substantially parallel sides and the width of each of the rectangular openings is proportioned so as to slidably fit the associated U-shaped projection so that the two parallel walls 10A and 10B of the U-shaped projection serve to transmit rotary motion of the clutch plate to the clutch shoe and to guide and retain the clutch shoe. The length of each of the rectangular openings is equal to the length of the U-shaped projection with additional length to permit limited radial movement of the clutch shoe relative to the clutch plate. The clutch shoes 7 each have a thickness slightly less than the height of the U-shaped projections 10 so that the associated U-shaped projection protrudes slightly beyond each of the clutch shoes.

The helical spring 8 disposed within each of the clutch shoes 7 has a first end bearing against the third wall 10C of the associated U-shaped projection 10 and a second end bearing against the opposite side of the opening 12 clutch shoe thus serving to bias the clutch shoes radially inward toward the driving hub. The helical springs are each retained by the arcuate floor portion 11 and the walls of the U-shaped projections in such position that the line of action of each of the springs is parallel to the planes of the clutch plate, passes through the center of mass of the clutch shoe on which it bears and is aligned along a radial line drawn through the driving hub. The helical springs 8 thus urge the associated clutch shoes to undergo translatory motion parallel to the plane of the clutch plates this minimizing objectionable tilting or rotation of the clutch shoes 7 relative to the clutch plate and consequent objectionable binding of the clutch shoes.

Each of the clutch shoes 7 has an outer arcuate friction surface 13 having a radius of curvature substantially equal to the inside radius of the hollow rotatable drum 4. An inner arcuate surface 14 has a radius of curvature substantially equal to that of the curved portion of the driving hub so as to enable the clutch shoe to approach close to the driving hub when the clutch shoe is in retracted position, thus providing a compact device.

An arcuate portion providing the outer arcuate surface 13 extends laterally beyond the portion of the shoe in which the rectangular opening 12 is formed so as to provide overhanging portions 13A at opposite sides of the shoe.

By way of example in the embodiment shown, the material of the clutch shoes 7 comprises porous bronze nonimpregnated friction material and the material of the clutch plates comprises sintered iron with the following nominal composition: Combined carbon 0.6 to 1.0, copper 4.5 to 5.5, iron balance.

A circular cover 15, FIG. 3, having an outer diameter smaller than the inner diameter of the hollow rotatable drum 4 is retained on the driving shaft 2 by the threaded portion of the driving hub 3 and serves to prevent accumulation of dirt on the clutch plate and on the clutch shoes and also retains the clutch shoes 7 and helical springs 8 in a direction perpendicular to the plane of the clutch plate 1.

In the embodiment of the invention shown there are a total of three clutch shoes with a single spring disposed within each clutch shoe. Alternatively more than three clutch shoes may be used. As a second alternative, more than one helical spring may be used within a single clutch shoe with the springs disposed so that they operate in parallel, resulting in a total spring stiffness equal to the sum of the individual spring stiffness. Variation on the performance characteristics of the centrifugal clutch may thus be accomplished by variation of the number and characteristics of helical springs within each clutch shoe. A further alternative may comprise the substitution of an elastomeric resilient pad for the helical spring shown.

The components of the centrifugal clutch may be assembled in different ways. For example, as shown in FIG. 2 the cover plate 15 is slipped onto the shaft 2 of a motor M and seals against a shoulder on the shaft. The clutch plate 1 carrying the shoes 7 and springs 8 is then screwed onto a threaded portion of the shaft 2. The drum 4 with sprocket 5 is then slipped on over the clutch plate and retained by a washer 16 and a nut 17 screwed onto a threaded end portion of the shaft.

In FIG. 4 there is shown another arrangement in which the drum 4 and sprocket 5 are first slipped onto the shaft 2 of a motor M with the sprocket toward the motor and the drum opening outwardly. The cover plate is then slipped over the shaft, and the clutch plate carrying the shoes 7 and springs 8 is screwed onto a threaded end portion of the shaft. In this arrangmeent the cover plate 15 can, if desired, be omitted.

Although the invention has been described with a certain degree of particularity, it is understood that the present disclosure has been made only by way of examples and that numerous changes in the details of construction and the combination and arrangement of parts may be resorted to without departing from the scopes of the invention as hereinafter claimed.

What I claim and desire to secure by Letters Patent is:

1. A centrifugal clutch comprising a rotatable hollow drum, a rotatable clutch plate having a central driving hub, the clutch plate being disposed in the rotatable drum, the clutch plate having a plurality of U-shaped projections projecting axially from said clutch plate and symmetrically disposed about the driving hub, each of said projection comprising spaced parallel side walls disposed approximately parallel to a radius of said clutch plate between said side walls and an end wall joining the radially outer ends of said side walls, said side walls and end wall defining a spring-receiving stall having an open end facing said hub, a portion of said clutch plate between said side walls forming a bottom of said stall, a pluraltiy of clutch shoes each having a rectangular opening of such size as to permit the shoe to fit over a U-shaped projection on the clutch plate with additional length to permit limited radial movement of the shoe, a plurality of helical compression springs, each helical spring being disposed within an opening in a clutch shoe and between the side walls of the U-shaped projection on which the shoe is fitted, each helical spring having a first end bearing against the end wall of the U-shaped projection and a second end bearing against the shoe, thus spring biasing the shoe radially inwardly away from the rotatable drum, each of the shoes being individually responsive to centrifugal force upon rotation of said clutch plate at a selected speed to overcome the biasing force of the helical spring to move radially outward away from the driving hub to engage the rotatable drum and induce rotary motion of said drum, said clutch shoes having an axial thickness approximately equal to the axial dimension of said projections, and said springs being disposed with their axes substantially radial of said clutch plate and in line with the center of mass of the associated clutch shoes so that the line of action of the centrifugal force of each clutch shoe is substantially coincident with the axis of the respective spring.

2. A centrifugal clutch according to claim 1 in which said clutch plate has a plurality of wing-like structures radiating out from said driving hub midway between said U-shaped projections, each of said wing-like structures having at its outer end and apertured enlargement.

References Cited
UNITED STATES PATENTS

| | | | |
|---|---|---|---|
| 2,464,437 | 3/1949 | Dasher | 192—107 X |
| 2,470,269 | 5/1949 | Schaefer | 192—107 X |
| 2,778,469 | 1/1957 | McIntyre | 192—105 |
| 2,809,535 | 10/1957 | Hein et al. | 192—105 X |
| 2,833,384 | 5/1958 | Wilson | 192—105 |

BENJAMIN W. WYCHE III, *Primary Examiner.*